United States Patent [19]

Shimizu et al.

[11] Patent Number: 5,170,065
[45] Date of Patent: Dec. 8, 1992

[54] ENGINE SPEED CONTROL APPARATUS

[75] Inventors: Motohiro Shimizu, Saitama; Kouichi Asai, Tokyo, both of Japan

[73] Assignee: Honda Giken Kogyo Kabushiki Kaisha, Tokyo, Japan

[21] Appl. No.: 870,783

[22] Filed: Apr. 16, 1992

Related U.S. Application Data

[63] Continuation of Ser. No. 612,417, Nov. 13, 1990, abandoned.

[30] Foreign Application Priority Data

Nov. 14, 1989 [JP] Japan ................................ 1-295632

[51] Int. Cl.$^5$ ........................... H02P 9/00; H02J 3/08
[52] U.S. Cl. .............................. 290/40 C; 290/40 R; 290/40 A; 290/51
[58] Field of Search .................. 290/40 R, 40 A, 40 B, 290/40 C, 51

[56] References Cited

U.S. PATENT DOCUMENTS

| | | | |
|---|---|---|---|
| 2,509,731 | 5/1950 | Edwards et al. | 290/40 C |
| 3,116,420 | 12/1963 | Fagel | 290/40 R |
| 4,322,630 | 3/1982 | Mezera et al. | 290/40 C |
| 4,461,958 | 7/1984 | Kröhling et al. | 290/51 |

Primary Examiner—A. D. Pellinen
Assistant Examiner—Robert Lloyd Hoover
Attorney, Agent, or Firm—Irving M. Weiner; Joseph P. Carrier; Pamela S. Burt

[57] ABSTRACT

An engine speed control apparatus controls the rotational speed of an engine when the engine is overloaded. The engine speed control apparatus includes a fuel injection rate detecting circuit for detecting the rate at which fuel is injected by a fuel injection unit, an engine speed detecting circuit for detecting the rotational speed of the engine, a fuel injection condition determining circuit for determining whether the rate detected by the fuel injection rate detecting circuit is substantially a maximum rate or not, a speed condition determining circuit for determining whether the rotational speed detected by the engine speed detecting circuit is increasing at least a predetermined rate of change or not, and an overload condition determining circuit for producing an engine overload signal to reduce the load driven by the engine if the rate is determined as substantially the maximum rate by the fuel injection condition determining circuit and also if the rotational speed is determined as not increasing at least at the predetermined rate of change by the speed condition determining circuit.

4 Claims, 5 Drawing Sheets

ENGINE SPEED CONTROL APPARATUS

This is a continuation of application Ser. No. 612,417, filed Nov. 13, 1990, now abandoned.

BACKGROUND OF THE INVENTION

1. Field of the Invention:

The present invention relates to an apparatus for controlling the rotational speed of an engine, and more particularly to an engine speed control apparatus for controlling the rotational speed of an engine when the engine operates under an excessive load condition.

2. Description of the Relevant Art:

There has been known an engine speed control process which effects PID (proportional plus integral plus derivative) control operations on a differential voltage corresponding to the difference between the actual rotational speed of an engine and a target or setpoint rotational speed, and adjusts the rate at which fuel is injected into the engine based on the output of the PID control, thereby controlling the rotational speed of the engine.

Figure 6:
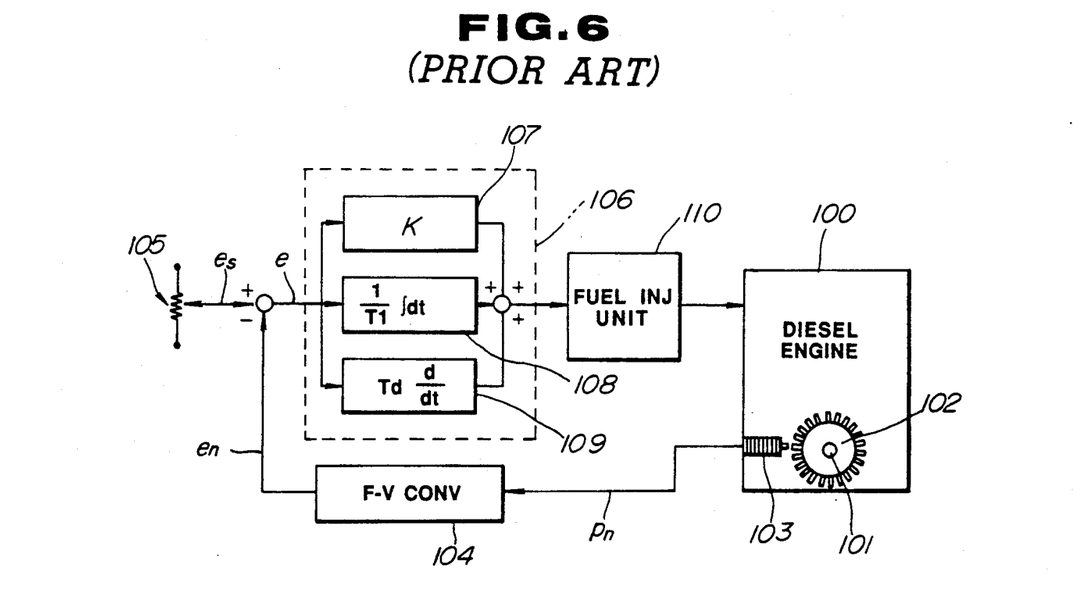
FIG. 6 is a block diagram of a conventional engine speed control apparatus in a fuel injection rate control system.

FIG. 6 of the accompanying drawings shows in block form a conventional engine speed control apparatus, which carries out the above known engine speed control process, in a fuel injection rate control system.

As shown in FIG. 6, the rotational speed of an engine 100 is detected by an engine speed detector which comprises a toothed rotor 102 mounted on the output shaft 101 of the engine 100, and a non-contact-type rotation sensor 103 for detecting the rotation of the toothed rotor 102. The rotation sensor 103 produces a pulse signal Pn whose period is proportional to the rotational speed of the engine 100. The pulse signal Pn is converted into a corresponding analog voltage en by a frequency-to-voltage (F/V) converter 104. The differential voltage $\Delta e$ between the voltage en and a voltage es which corresponds to a target or setpoint rotational speed given by a target speed setting unit 105 is applied to a PID control circuit 106 in which the differential voltage $\Delta e$ is subjected to proportional, integral, and derivative operations by a proportional amplifier 107, an integrator 108, and a differentiator 109, respectively. An output signal from the PID control circuit 106 is then delivered to a fuel injection unit 110, which adjusts the rate at which fuel is injected into the engine 100 thereby to control the rotational speed of the engine 100.

According to the illustrated engine speed control apparatus with the feedback loop, as the load on the engine 100 increases, the rotational speed thereof decreases, and therefore the fuel injection rate is increased in order to bring the rotational speed back to the target rotational speed. However, the prior engine speed control apparatus is incapable of coping with any engine loads in excess of the engine power output at the maximum fuel injection rate. When the engine is under such an overloaded condition, the rotational speed of the engine is reduced and so is the engine power output, sometimes resulting in an engine stall.

For example, it is assumed that an engine is mechanically coupled to a synchronous generator which generates electric energy having a commercial frequency. When a load such as a mercury lamp or an electric motor, which consumes a large current temporarily upon its starting, is connected to the output terminal of the synchronous generator, the load on the generator is temporarily increased, and hence the engine is overloaded when the connected mercury lamp or electric motor starts to be energized. The overloaded engine reduces the rotational speed and power output thereof, so that the electric energy generated by the generator mechanically coupled to the generator is also reduced in level. Regardless of the temporary overloaded condition, it takes the overall system a relatively long period of time to get back to its normal operation, and the output frequency of the generator is lowered until the normal operation is resumed.

SUMMARY OF THE INVENTION

It is an object of the present invention to provide an engine speed control apparatus which controls an engine to operate in a speed range for maximum engine power output at all times, without causing a reduction in the rotational speed of the engine, even when the engine is under an overloaded condition.

According to the present invention, there is provided an apparatus for controlling the rotational speed of an engine which drives a load, the engine having a fuel injection unit, comprising fuel injection rate detecting means for detecting the rate at which fuel is injected by the fuel injection unit, engine speed detecting means for detecting the rotational speed of the engine, fuel injection condition determining means for determining whether the rate detected by the fuel injection rate detecting means is substantially a maximum rate, speed condition determining means for determining whether the rotational speed detected by the engine speed detecting means is increasing at least at a predetermined rate of change, and overload condition determining means for producing an engine overload signal to reduce the load driven by the engine if the rate is determined as substantially the maximum rate by the fuel injection condition determining means and also if the rotational speed is determined as not increasing at least at the predetermined rate of change by the speed condition determining means.

The load is an electric generator having an automatic voltage regulator which lowers an output voltage thereof in response to the engine overload signal.

When the rotational speed of the engine is not increasingly at least at the predetermined rate of change even though fuel is being injected substantially at the maximum rate, then the overload condition determining means determines that the engine is overloaded and produces the engine overload signal to lower the load on the engine. With the load on the engine being lowered, the rotational speed of the engine and hence the engine power output are therefore prevented from being lowered to a large extent.

With the load on the engine being an electric generator, the output voltage of the generator is lowered in response to the engine overload signal. The rotational speed of the engine is maintained at a predetermined speed level, and the output frequency of the generator is stabilized.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
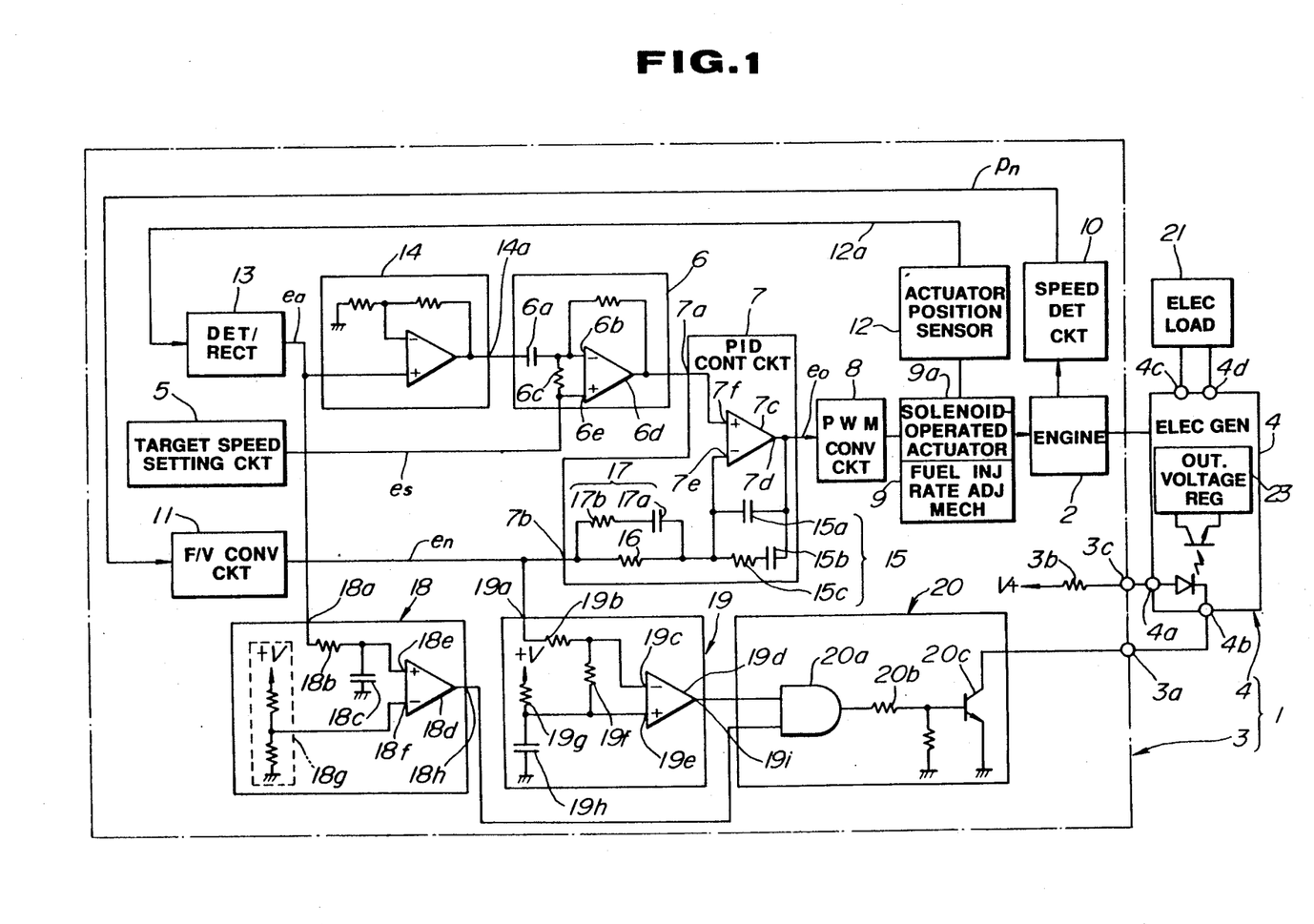
FIG. 1 is a block diagram of an engine-driven generator system incorporating an engine speed control apparatus according to the present invention.

FIG. 1 shows an engine-driven generator system 1 which comprises an engine speed control apparatus 3 for automatically controlling the rotational speed of an engine 2 through adjustment of the rate at which fuel is supplied to the engine 2, and an electric generator 4 which is driven by the engine 2.

The engine speed control apparatus 3 has a target or setpoint rotational speed setting circuit 5 for setting a target or setpoint rotational speed. A voltage es corresponding to the target rotational speed set by the target rotational speed setting circuit 5 is applied through a superposition circuit 6 to one input terminal 7a of a PID (proportional plus integral plus derivative) control circuit 7, whereas a voltage en corresponding to the actual rotational speed of the engine 2 is applied to the other input terminal 7b of the PID control circuit 7. The PID control circuit 7 effects proportional, integral, and derivative control operations on the differential voltage (es−en) between the applied voltages es, en, thereby producing an output voltage eo which is applied through a PWM (pulse-width modulation) converter 8 to drive a solenoid-operated actuator 9a of a fuel injection rate adjusting mechanism 9. The solenoid-operated actuator 9a now varies the rate at which fuel is injected to the engine 2, for thereby controlling the rotational speed of the engine 2.

An engine speed detector 10 produces a pulse signal Pn whose frequency is proportional to the rotational speed of the engine 2. The pulse signal Pn is then converted by a frequency-to-voltage (F/V) converter 11 into the analog voltage en which corresponds to the frequency of the pulse signal Pn.

The position of the solenoid-operated actuator 9a of the fuel injection rate adjusting mechanism 9 is detected by an actuator position sensor 12, which produces an output signal 12a that is converted into a DC signal ea by a detector and rectifier 13. The DC signal ea is amplified by a noninverting amplifier 14, the output signal of which is applied through a capacitor 6a to a noninverting input terminal 6b of an operational amplifier 6d in the superposition circuit 6.

The mechanical construction of the solenoid-operated actuator 9a and the actuator position sensor 12 will be described below by way of example with reference to FIG. 2.

Figure 2:
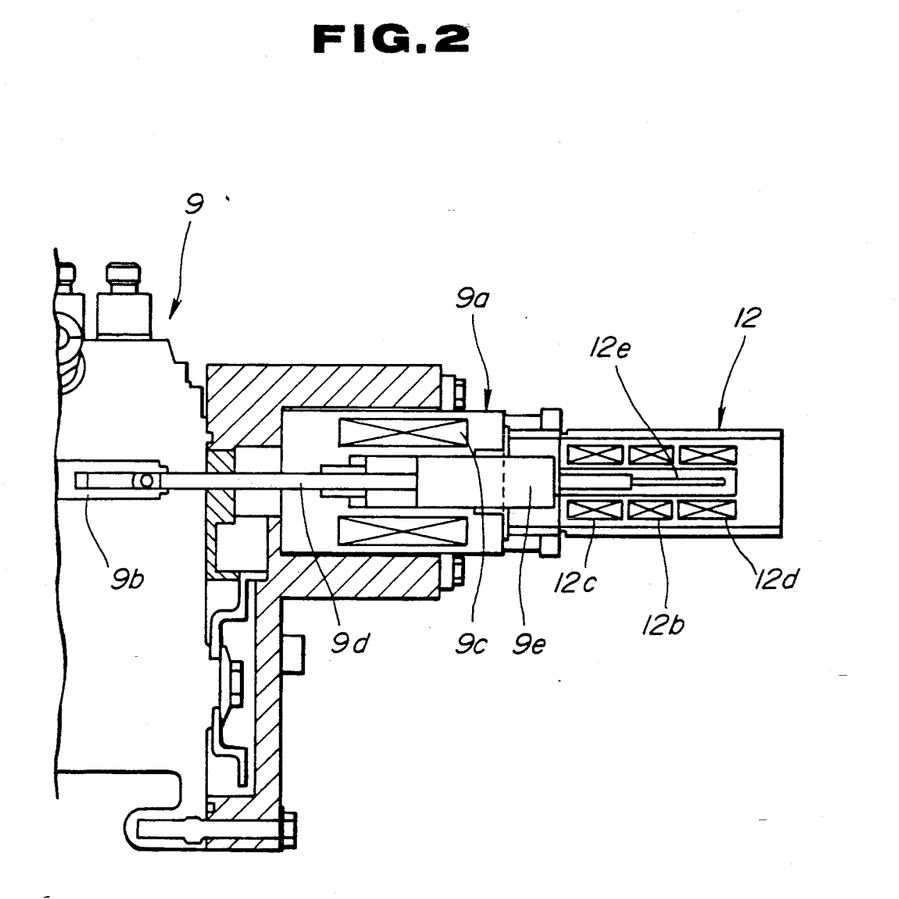
FIG. 2 is a cross-sectional view of a solenoid-operated actuator and an actuator position sensor in the engine-driven generator system shown in FIG. 1.

In FIG. 2, the fuel injection rate adjusting mechanism 9, which is used in combination with a diesel engine, has a control rack 9b that can be driven by the solenoid-operated actuator 9a. The solenoid-operated actuator 9a, which is positioned on one side of the fuel injection rate adjusting mechanism 9, includes a pusher rod 9d coupled to the control rack 9b. The actuator position sensor 12 is in the form of a differential transformer positioned on one side of the solenoid-operated actuator 9a remotely from the pusher rod 9d.

The solenoid-operated actuator 9a has a coil 9c and a movable core 9e movably disposed in the coil 9c and joined to the pusher rod 9d. When the coil 9c is energized, the movable core 9e is axially moved to axially displace the pusher rod 9d therewith. The actuator position sensor 12 comprises a linear displacement sensor in the form of a differential transformer which has a primary coil 12b, a pair of secondary coils 12c, 12d disposed one on each side of the primary coil 12b, and a movable core 12e axially movably inserted in the primary and secondary coils 12b, 12c, 12d. The movable core 12e is axially connected to the movable core 9e of the solenoid-operated actuator 9a. When the primary coil 12b is energized with a low-frequency alternating current, the voltage induced across the secondary coils 12c, 12d, which are connected in opposite polarity to each other, and the polarity of the voltage vary depending on the position of the movable core 12e with respect to the coils 12c, 12d. Therefore, the displacement of the actuator 9a can be detected on the basis of the induced voltage and the polarity thereof.

Referring back to FIG. 1, the engine speed control apparatus 3 will further be described below.

The detector and rectifier 13 is arranged such that the output voltage ea thereof increases when the output signal 12a of the actuator position sensor 12 varies in response to an increase in the fuel injection rate. The output signal ea of the detector and rectifier 13 is amplified in a DC manner by the noninverting amplifier 14. The voltage of the amplified output signal, which corresponds to the variation in the actuator position, is differentiated by a differentiating circuit composed of a capacitor 6a and a resistor 6c, and applied to the noninverting input terminal 6b of the operational amplifier 6d. The operational amplifier 6d has another noninverting input terminal 6e which is supplied with the output voltage es from the target speed setting circuit 5. In the absence of any differentiated input voltage applied to the noninverting input terminal 6b, the output voltage from the superposition circuit 6 is the same as the voltage es. When the solenoid-operated actuator 9a is displaced in a direction to increase the fuel injection rate, the output voltage from the superposition circuit 6 becomes lower than the voltage es due to an input signal from the differentiating circuit 6a, 6c. When the solenoid-operated actuator 9a is displaced in a direction to reduce the fuel injection rate, the output voltage from the superposition circuit 6 becomes higher than the voltage es.

The PID control circuit 7 comprises an operational amplifier 7c, an integrator 15 connected between an output terminal 7d and an inverting input terminal 7e of the operational amoplifier 7c, an input resistor 16 having one end connected to the inverting input terminal 7e, and a differentiator 17 connected parallel to the input resistor 16. The integrator 15 comprises a capacitor 15a and a series-connected circuit parallel to the capacitor 15a and including a capacitor 15b and a resistor 15c. The differentiator 17 comprises a series-connected circuit including a capacitor 17a and a resistor 17b.

The output signal ea from the detector and rectifier 13 is applied to a maximum fuel injection detector 18. More specifically, the maximum fuel injection detector 18 has a time-constant circuit comprising a resistor 18b connected to an input terminal 18a and a capacitor 18c, and a voltage comparator 18d having a positive input terminal 18e connected to the time-constant circuit. The output signal ea is applied through the input terminal 18a and the time-constant circuit to the positive input terminal 18e of the voltage comparator 18d. The voltage comparator 18d has a negative input terminal 18f to which there is applied a reference voltage from a reference voltage generator 18g, the reference voltage being the output voltage produced by the detector and rectifier 13 when the fuel injection rate adjusting mechanism 9 is substantially in the position to inject fuel at a maximum rate. When the fuel is injected at the maximum rate for a period of time longer than the time constant determined by the resistor 18b and the capacitor 18c, an output signal from an output terminal 18h of the maximum fuel injection detector 18 goes high in level.

Alternatively, the condition in which the fuel is injected at the maximum rate may be detected by a limit switch or the like that detects displacement of the solenoid-operated actuator 9a to a predetermined position.

The output voltage en from the frequency-to-voltage converter 11 is applied to an engine speed detector 19. The engine speed detector 19 comprises a resistor 19b connected to an input terminal 19a, a voltage comparator 19d having a negative input terminal 19c and a positive input terminal 19e, a resistor 19f connected between the negative and positive input terminals 19c, 19e, a resistor 19g connecting the positive input terminal 19e to a positive power supply +V therethrough, and a capacitor 19h connecting the positive input terminal 19e to ground therethough. The output voltage en is applied through the input terminal 19a and the resistor 19b to the negative input terminal 19c of the voltage comparator 19d. When the output voltage en from the frequency-to-voltage converter 11 increases in a certain time constant, the voltage at the negative input terminal 19c is higher than the voltage at the positive input terminal 19e, enabling the voltage comparator 19d to produce a low-level output signal at an output terminal 19i thereof. When the output voltage en is maintained at the same level for a certain period of time or decreases, the voltage at the positive input terminal 19e is higher than the voltage at the negative input terminal 19c, whereupon the output signal from the output terminal 19i goes high in level.

The output signals from the maximum fuel injection detector 18 and the engine speed detector 19 are applied to an AND gate 20a in an engine overload control circuit 20. The output signal from the AND gate 20a is applied through a resistor 20b to a transistor 20c in the engine overload control circuit 20. When the transistor 20c is energized, a current flows from the positive power supply +V through a resistor 3b, a terminal 3c, a terminal 4a, a light-emitting diode in the synchronous generator 4, a terminal 4b, and a terminal 3a to the transistor 20c, thus transmitting the information indicating that the engine 2 is overloaded to the synchronous generator 4.

In response to the engine overload signal, the synchronous generator 4 lowers its output voltage between output terminals 4c, 4d, thereby reducing the electric energy supplied to an electric load 21 connected to the synchronous generator 4.

Figure 3:
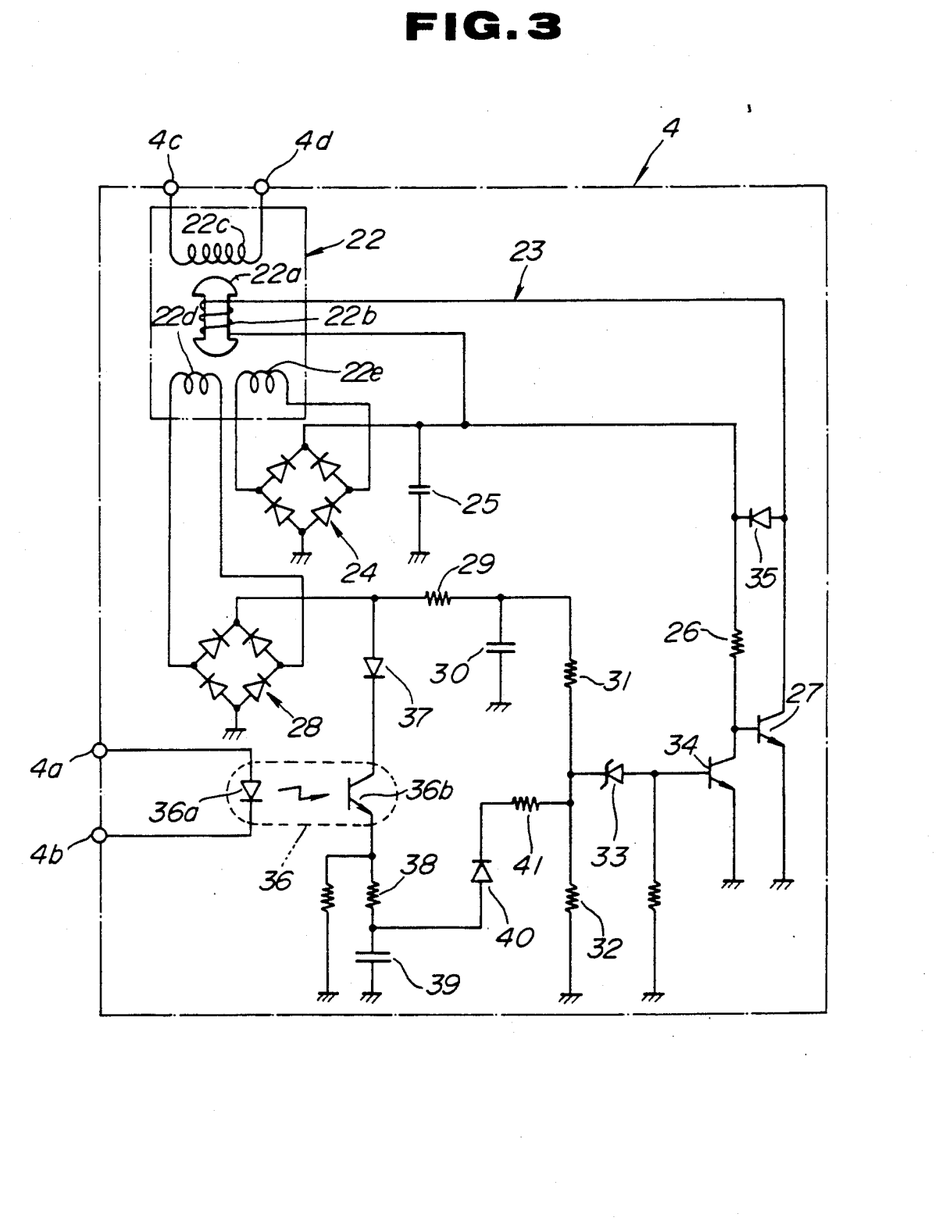
FIG. 3 is a circuit diagram of an electric generator in the engine-driven generator system shown in FIG. 1.

FIG. 3 shows a circuit arrangement of the synchronous generator 4.

The synchronous generator 4 generally comprises a winding assembly 22 and an output voltage regulator 23.

The winding assembly 22 comprises a field winding 22b wound on a rotor 22a, an output winding 22c wound on a stator, a voltage detecting winding 22d, and an exciting winding 22e. The output winding 22c is connected to the output terminals 4c, 4d.

An AC voltage generated across the exciting winding 22e is rectified by a full-wave rectifier diode bridge 24, and the rectified voltage is smoothed by a capacitor 25. The smoothed voltage is then supplied to the base of a transistor 27 through a base resistor 26, rendering the transistor 27 conductive to supply a current to the field winding 22b.

Figure 4A:
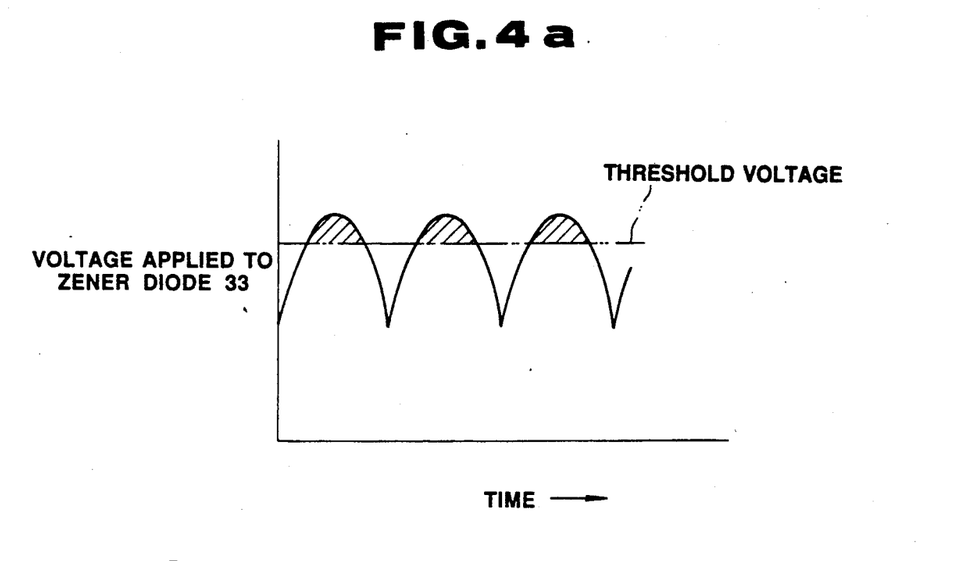
FIGS. 4a and 4b are waveform diagrams showing voltages across an output detecting winding of an output voltage regulating circuit in the electric generator shown in FIG. 3.

An AC voltage generated across the voltage detecting winding 22d is rectified by a full-wave rectifier diode bridge 28, and the rectified voltage is smoothed into a voltage containing ripples as shown in FIG. 4a by a smoothing circuit which comprises a resistor 29 and a capacitor 30. Thereafter, the smoothed voltage is divided by resistors 31, 32, and applied to the base of a transistor 34 through a zener diode 33.

During periods of time (shown hatched in FIG. 4a) in which a voltage higher than a predetermined threshold voltage is applied to the zener diode 33, a current is supplied to the base of the transistor 34 for a longer period of time. Because the transistor 34 is energized and the transistor 27 is de-energized, therefore, the field winding 22b is de-energized for a longer period of time, lowering the voltage generated by the synchronous generator 4. By varying the period of time in which the current is supplied to the field winding 22b, the output voltage eo generated between the output terminals 4c, 4d is kept at a rated level.

A diode 35, which is connected parallel to the field winding 22b, serves to absorb a current surge produced in the field winding 22b when the transistor 27 is switched on and off.

Figure 4B:
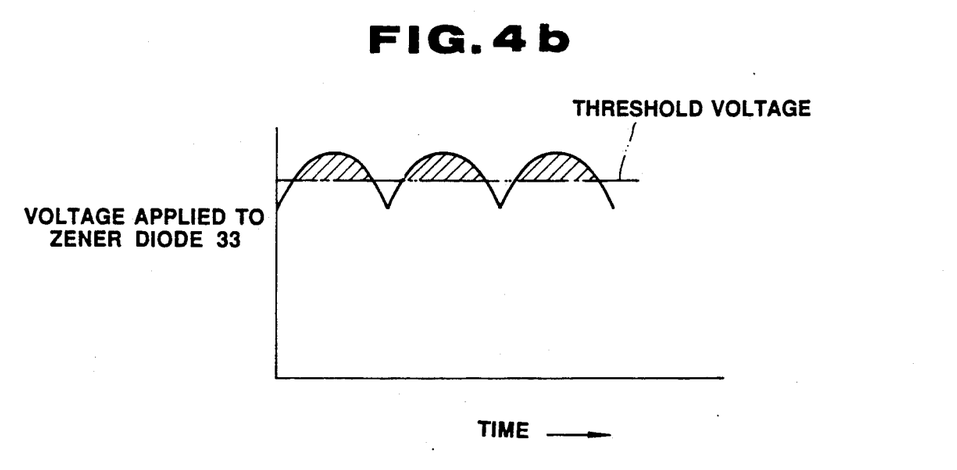

A photocoupler 36 has a light-emitting diode 36a connected between the terminals 4a, 4b and a phototransistor 36b which is connected through a diode 37 to the diode bridge 28. When the phototransistor 36b is energized, a capacitor 39 is charged by a current which flows from the diode bridge 28 through the diode 37, the phototransistor 36b, and a resistor 38, and a voltage across the capacitor 39 is applied through a diode 40 and a resistor 41 to the cathode of the zener diode 33. Therefore, the voltage applied to the zener diode 33 contains less ripples as shown in FIG. 4b, and the transistor 34 is energized for a longer period of time. As a result, the voltage generated by the generator 4 is lowered.

If the electric load 21 on the generator 4 is increased in excess of the rated load of the engine-driven generator system 1, and the rotational speed of the engine 2 is lowered even with the maximum rate of fuel injected into the engine 2, the engine overload control circuit 20 in the engine speed control apparatus 3 applies an engine overload signal to the output voltage regulator 23, which then lowers the generated voltage below the rated output voltage of the generator 4. Therefore, the electric energy supplied from the generator 4 to the electric load 21 is reduced.

The engine 2 is now released from the overloaded condition, and the feedback control loop in the engine speed control apparatus 3 restores its normal feedback control operation. Since the engine 2 rotates at the target speed, the frequency of the electric energy generated by the generator 4 is maintained at a constant level.

Figure 5:
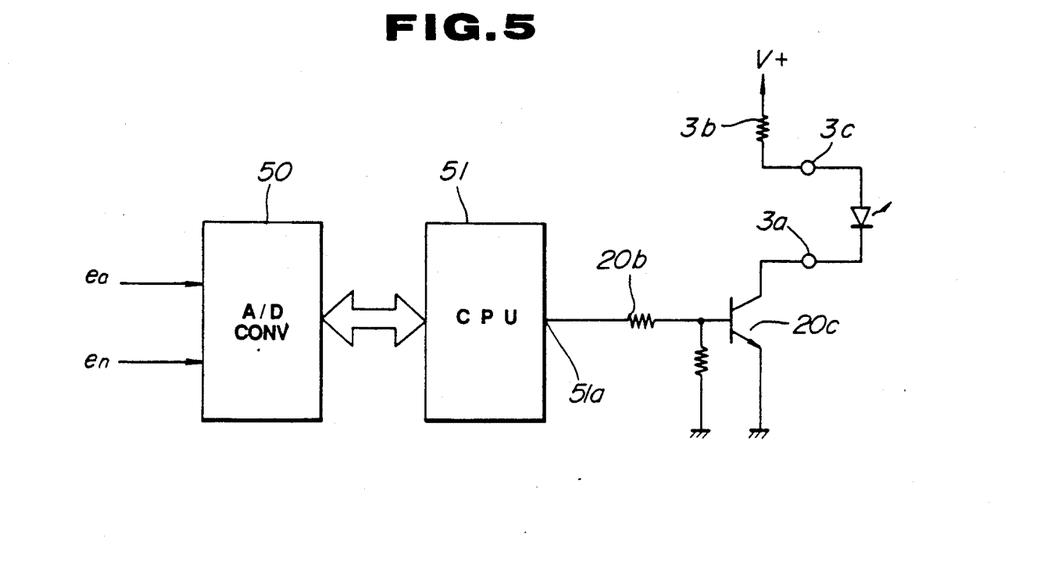
FIG. 5 is a block diagram of an engine overload control circuit according to another embodiment.

FIG. 5 shows in block form an engine speed control apparatus according to another embodiment of the present invention.

In the embodiment shown in FIG. 5, a voltage en corresponding to the actual rotational speed of the engine 2 and a voltage ea corresponding to the position of the actuator 9a are applied to an analog-to-digital (A/D) converter 50. Digital values corresponding to the respective voltages en, ea are read by a CPU 51 at predetermined intervals of time. When the read digital values satisfy predetermined conditions, the CPU 51 produces a high-level output signal at an output port 51a thereof, thereby energizing the transistor 20c through the resistor 20b. More specifically, when the condition that the digital value corresponding to the voltage ea is equal to or greater than a predetermined value is achieved successively three times, for example, the CPU 51 determines that the fuel is injected at the maximum rate. When the digital value corresponding to the voltage en is smaller than the previous value or the value preceding the previous value by a predetermined extent, the CPU 51 determines that the rotational speed of the engine is lowered. If both the above conditions are satisfied, the CPU 51 determines that the engine is overloaded.

With the present invention, as described above, even when the engine is overloaded, the rotational speed of the engine is not lowered. The engine can be operated in a speed range where it can produce a nearly maximum power output according to the speed/output characteristics of the engine, and hence the engine power output can be produced to the maximum limit even when the engine is overloaded.

Since the engine speed control apparatus according to the present invention can use signals required by the feedback control loop of existing fuel injection control systems, the engine speed control apparatus is relatively simple in arrangement.

Even if a load such as a mercury lamp or an electric motor, which consumes a large current temporarily upon its starting, is connected as the electric load of the generator driven by the engine, the engine power output can be utilized at maximum for quickly bringing the feedback control loop back to its normal operation. Since the rotational speed of the engine does not vary, the frequency of the generated electric energy is maintained stably when the synchronous generator is employed.

Although there have been described what are at present considered to be the preferred embodiments of the present invention, it will be understood that the invention may be embodiment in other specific forms without departing from the essential characteristics thereof. The present embodiments are therefore to be considered in all aspects as illustrative, and not restrictive. The scope of the invention is indicated by the appended claims rather than by the foregoing description.

We claim:

1. An apparatus for controlling the rotational speed of an engine which drives a load, comprising:
    a fuel injection unit for injecting fuel to the engine, said fuel injection unit having a fuel injecting rate adjusting mechanism for adjusting a rate at which fuel is injected to the engine and an actuator for actuating said fuel injection rate adjusting mechanism;
    fuel injection rate detecting means for detecting the fuel injection rate as a voltage signal representing the displacement of said actuator;
    engine speed detecting means for detecting the rotational speed of the engine as a pulse signal having a frequency proportional to the rotational speed of the engine, said engine speed detecting means producing a voltage signal representing the rotational speed of the engine based on the frequency of said pulse signal;
    overload condition determining means for producing an engine overload signal to reduce the load driven by the engine so that engine operation can be controlled and maintained at a nearly maximum power output until the engine is released from an overloaded condition, if said fuel injection rate is determined as substantially the maximum rate by said fuel injection conditioning determining means and also if the rotational speed is determined as not increasing at least at said predetermined rate of change by said speed condition determining means.

2. An apparatus according to claim 1, including said load, said load comprising a synchronous generator having a field winding, an output winding and an automatic voltage regulator for regulating an output voltage of said synchronous generator;
    said automatic voltage regulator including a voltage detecting winding for detecting a voltage generated by said synchronous generator and arranged such that while said voltage detecting winding is generating a voltage higher than or equal to a predetermined voltage, the automatic voltage regulator decreases a current supplied to said field winding, and while said voltage detecting winding is generating a voltage lower than said predetermined voltage, the automatic voltage regulator increases a current supplied to said field winding so as to maintain the output voltage from said synchronous generator at said predetermined voltage; and
    wherein said automatic voltage regulator forcibly reduces said predetermined voltage in repsonse to said engine overload signal.

3. An apparatus according to claim 1, wherein said fuel injection condition determining means comprises a first voltage comparator for comparing a voltage corresponding to the rate detected by said fuel injection rate detecting means with a first reference voltage, and for producing a high-level output signal when said voltage corresponding to said fuel injection rate is higher than said first reference voltage;
    said speed condition determining means comprising a second voltage comparator for comparing a voltage corresponding to the rotational speed detected by said engine speed detecting means with a second reference voltage, and for producing a high-level output signal when said voltage corresponding to said rotational speed is lower than or the same as said second reference voltage; and
    wherein said overload condition determining means comprises means for producing said engine overload signal in response to receiving both said high-level output signals from said first and second voltage comparators.

4. An apparatus according to claim 3, including said load, said load comprising a synchronous generator having a field winding, an output winding and an automatic voltage regulator for regulating an output voltage of said synchronous generator;

said automatic voltage regulator including a voltage detecting winding for detecting a voltage generated by said synchronous generator and arranged such that while said voltage detecting winding is generating a voltage higher than or equal to a predetermined voltage, the automatic voltage regulator decreases a current supplied to said field winding and while said voltage detecting winding is generating a voltage lower than said predetermined voltage, the automatic voltage regulator increases a current supplied to said field winding so as to maintain the output voltage of said synchronous generator at said predetermined voltage; and wherein said automatic voltage regulator forcibly reduces said predetermined voltage in response to said engine overload signal.

* * * * *

UNITED STATES PATENT AND TRADEMARK OFFICE
CERTIFICATE OF CORRECTION

PATENT NO. : 5,170,065
DATED : December 8, 1992
INVENTOR(S) : Shimizu et al.

It is certified that error appears in the above-identified patent and that said Letters Patent is hereby corrected as shown below:

Column 4, line 63 change "amoplifier" to --amplifier--.

Column 8, between lines 14 and 15 (claim 1, lines 18 and 19), please insert the following two paragraphs:
--fuel injection condition determining means for determining whether the fuel injection rate detected by said fuel injection rate detecting means is substantially a maximum rate;
    speed condition determining means for determining whether the rotational speed detected by said engine speed detecting means is increasing at least at a predetermined rate of change; and--

Signed and Sealed this

Fifth Day of October, 1993

*Attest:*

BRUCE LEHMAN

*Attesting Officer*    Commissioner of Patents and Trademarks